(12) United States Patent
Agrawal et al.

(10) Patent No.: US 7,961,642 B2
(45) Date of Patent: Jun. 14, 2011

(54) SYSTEM AND METHOD FOR OBTAINING NETWORK LINK STATE INFORMATION FROM SEQUENTIAL DISTANCE VECTOR ROUTING TABLES

(75) Inventors: Dakshi Agrawal, Monsey, NY (US); Alina Beygelzimer, White Plains, NY (US); Bong Jun Ko, Harrington, NJ (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/129,269

(22) Filed: May 29, 2008

(65) Prior Publication Data

US 2009/0296710 A1 Dec. 3, 2009

(51) Int. Cl.
*H04L 12/26* (2006.01)
(52) U.S. Cl. ......... 370/252; 370/241; 370/229; 370/238
(58) Field of Classification Search .................. 370/241, 370/252, 229, 235, 238
See application file for complete search history.

(56) References Cited

U.S. PATENT DOCUMENTS

| 6,442,144 | B1 * | 8/2002 | Hansen et al. | 370/255 |
| 7,013,347 | B1 * | 3/2006 | Moen | 709/238 |
| 7,636,318 | B2 * | 12/2009 | Nandy et al. | 370/242 |
| 2006/0007865 | A1 * | 1/2006 | White et al. | 370/238 |
| 2007/0016670 | A1 * | 1/2007 | Cooper | 709/224 |

* cited by examiner

*Primary Examiner* — William Trost, IV
*Assistant Examiner* — Siming Liu
(74) *Attorney, Agent, or Firm* — F. Chau & Associates, LLC; Preston J. Young, Esq.

(57) ABSTRACT

A method of determining the state of network links based on differences in corresponding distance-vectors in a sequence routing table updates, and a network management system performing the method. The network management system comprises least one monitoring apparatus adapted to determine the state of network links. The monitoring apparatus may be a router in the network adapted to determine link status, or a personal computer or server peered with a router and configured to determine the state of network links based on differences in corresponding distance-vectors in a sequence of routing table updates.

11 Claims, 4 Drawing Sheets

US 7,961,642 B2

SYSTEM AND METHOD FOR OBTAINING NETWORK LINK STATE INFORMATION FROM SEQUENTIAL DISTANCE VECTOR ROUTING TABLES

STATEMENT REGARDING FEDERALLY SPONSORED RESEARCH OR DEVELOPMENT

This invention was made with Government support under Contract No.: W911NF-06-3-0001 awarded by U.S. Army. The Government has certain rights in this invention.

BACKGROUND

1. Field of the Invention

The present invention relates to the field of network management and more particularly to a method of deducing the state of network links from sequentially received distance-vector routing updates and/or from a sequence of routing table updates and a network management system performing the method.

2. Discussion of Related Art

The internet is a packet-switched network comprising numerous routers and links between the routers. In packet-switched networks, information to be carried is split up into packets, which may take different routes across a network from a sender to a receiver, and such networks are now increasingly used to carry telephony-type information, e.g., voice or video information. Timely localization of faulty components (e.g., broken links, failed router interfaces) remains one of the most important problems in network management while instrumenting and monitoring every single component is infeasible. Network management systems need to obtain reliable and up-to-date information about the states of network links (e.g., broken links, failed router interfaces) in order to monitor the health of the network and to perform root-cause-analysis. Soft-failures of links (e.g., link cost increase) are hard or expensive to detect.

There are two major classes of routing protocols used in packet-switched networks: Distance-vector routing protocols and Link-state routing protocols. Distance-vector routing protocols (e.g., EIGRP, AODV, DSDV, RIP, RTMP) are simple and efficient in fairly small environments, and require little, if any configuration and management (unlike link state protocols).

A distance vector routing protocol can best be understood by recalling the meaning of the word vector. A vector is a number with two components: magnitude and direction. In a network, a vector is said to have "cost" and direction or distance and direction.

In a distance vector protocol, neighboring routers (e.g., routers connected to the same subnetwork) exchange tables of routing vectors. Routers following a typical distance vector routing protocol periodically send routing updates to all neighboring routers by broadcasting their entire routing tables. The routing tables are lists of distance vectors, each distance vector consisting of entries in the form <destination, distance, direction>, where distance is defined in terms of a metric (e.g., hop count) and direction is defined in terms of specifying a next-hop (neighboring) router. Each router pulls from its routing table a list of all known subnetworks, and some metric relating the goodness or "cost" of the path to that subnetwork. This information is transmitted to all neighboring routers.

Each link e in the network may have an associated cost denoted by cost(e). The cost of a route from source node s to destination node d denoted cost(s, d) is the sum of the costs of all links on the route from s to d. If all links on a route have cost 1, the cost of the route is simply the number of links (hops) along the route. A distance vector in a table received by router s minimally includes the following parameters: <d, a, c> and indicates that from the perspective of s, the next hop on the shortest route from s to d is router a, denoted as next-hop (s, d)=a, and the cost of the shortest route from router s to router a is c.

Upon receiving an updated distance vector from a neighboring router, the router implementing a distance vector routing protocol begins the process of updating its own (local) routing table. For each subnetwork listed in a received routing table, the router extracts the cost information from the received routing table and adds to it the cost of the link from the neighbor that sent the received routing table to the receiving router. The receiving router then examines the current (local) routing table to determine if the subnetwork is listed and if it is, the cost to reach that network using the current route. If the subnetwork is not listed in the table, the routing protocol adds the new subnetwork including the port on which the update was received and the address of the router that sent the update. This router is the best known path to the new subnetwork.

If the subnetwork already appears in the table, the routing protocol compares the current cost to the cost it calculated via the updating router. If the router that transmitted the updated (received) routing table is reporting a lower cost route, the routing protocol updates the routing table entry for that subnetwork with the new router's address, the port on which the update was received, and the newly calculated cost. The router that transmitted the update now represents the best known route to the indicated subnetwork.

For example, a received routing table may include a distance vector indicating that "Destination A is 5 hops away (from neighboring g router), in the direction of next-hop router X." When the receiving router receives that distance vector from its neighbor, it determines whether its cost of reaching any destination would decrease if packets to that destination were to be sent through that neighbor. If so, the router updates its own distance vector. Thus each router learns better (less costly) routes from its neighboring routers' perspectives, and then advertises the best routes from its own perspective, thus propagating the updated distance vectors. Alternatively, if a link is severed (hard failure) or its link cost increases (soft failure) a router directly connected to that link detects the change, and then transmits a routing table including distance vectors indicating an increased cost from its own perspective, thus propagating the updated distance vectors. It should be noted that it is not essential for a distance vector routing protocol to transmit its updates periodically. The updates can be transmitted only in the event of a change. Newer distance vector routing protocols take this approach.

In a link state routing protocol, the changes to the link state is readily available. On the other hand, the routing events in a distance vector protocol (routing table updates) broadcast only the length of the shortest path from a node s to node d but do not explicitly include changes to the link state.

The Simple Network Management Protocol (SNMP) defines a standard by which a remote user can view or change management information for a networked device (a host, gateway, router, server, etc.). A monitoring or management application on the remote user's system uses the SNMP protocol to communicate with an SNMP agent on the device to access the network management data. The SNMP agent on each device can provide information about the device's network configuration and operations, such as the device's network interfaces, routing tables, IP packets sent and received, and IP packets lost. This information, called SNMP objects, is stored in a standard format defined in the Management Information Base (MIB). The SNMP protocol, together with the MIB, provide a standard way to view and change network management information on devices from different vendors. The MIB defines the SNMP objects that can be managed and the format for each object. Any application that implements SNMP can access MIB data on a specified device. SNMP traps enable an agent to notify the management station of significant events by way of an unsolicited SNMP message.

Directed acyclic graphs, called "dags", are an important class of graphs, being part "tree", part graph, and having many applications. Using dags, many problems in graphs become simpler to analyze and solve. In the context of a network topology, a directed acyclic graph (DAG) shows all the routes originating from a source node s. The dag(s) is constructed as a minimum weight spanning tree rooted at s. Every router in the network topology is a vertex in dag(s).

A directed acyclic graph has no directed cycles; that is, for any vertex v, there is no nonempty directed path that starts and ends on v. DAGs are used as models where it doesn't make sense for a vertex to have a path to itself. Every directed acyclic graph has a topological sort, an ordering of the vertices such that each vertex comes before all vertices it has edges to. Informally speaking, a DAG "flows" in a single direction, e.g., from source node s to destination node d. Each directed acyclic graph gives rise to a partial order $\leq$ on its vertices, where $u \leq v$ exactly when there exists a directed path from u to v in the DAG. For every router d in the network topology dag(s), we add a directed edge (nextHop(d, s), d) to dag(s), where nextHop(d, s) denotes the next hop from node d towards node s.

BRIEF SUMMARY

According to an embodiment of the present invention link state changes are detected from differences in corresponding distance vectors in a sequence of routing table updates while interfacing (peering) with as small a number of network routers/monitors. The method of detecting link state changes from distance vector routing tables uses a current functionality of existing (conventional) network routers, thereby minimizing instrumentation costs.

According to an embodiment of the present invention link state changes of the network are detected by monitoring the network distance changes from an optimized (minimal) subset of routers.

According to an embodiment of the present invention a network management system comprises at least one monitoring apparatus adapted to detect link state changes from differences in corresponding distance vectors in a sequence of routing table updates. The monitoring apparatus may be a router adapted to perform the detection method in the network, or an external apparatus (e.g., a personal computer) configured to perform the detection method.

According to an embodiment of the present invention a computer program embodied on a computer-readable medium monitors link states in a network by comparing a sequence of routing signals comprising distance vectors, to determine the state of a link between routers in the network based on the difference between corresponding distance vectors in a sequence of routing signals.

According to an embodiment of the present invention a distance between (s, d) is correlated as indicated by corresponding distance vectors (table updates) distributed at different times t (e.g., t1 and t2, such that t2>t1)) to detect link state changes. For example, let $cost(s, d)_{t1}$ denote the distance metric (cost) of the links from s to d at time t1. If $cost(s, d)_{t2} > cost(s, d)_{t1}$ then one or more links on the old (t1) route from s to d must have failed. The cost(s, d) from multiple (s, d) pairs may be correlated to determine the root cause (e.g., to specify the link failure(s)) that caused an increase in this distance (cost) metric. Examining more distance vectors pairs (comparing changes in $cost(s, d)_t$ of more (s, d) pairs) improves the probability of identifying the root cause.

According to an embodiment of the present invention the smallest number of sources (routers) needed to accurately deduce the link state is determined. A set of routers to interface (peer) with is strategically selected to detect changes in link states of all active network links. The updates of the network distances from the selected routers are received and analyzed. The link state changes from the information of the network distance changes obtained from the subset of network routers is automatically deduced.

The attached drawings for illustrating preferred embodiments of the present invention are referred to in order to convey a sufficient understanding of the present invention to persons skilled in the art.

BRIEF DESCRIPTION OF THE SEVERAL VIEWS OF THE DRAWINGS

The above and other features of the present invention will become more apparent to persons skilled in the art by describing in detail preferred embodiments thereof with reference to the attached drawings in which like reference numerals in the drawings denote like elements, and.

DETAILED DESCRIPTION

Detecting link state changes from distance vector routing tables (updates) is a non-trivial problem solved by an aspect of the present invention that provides a method of determining the state of links in a network using distance vector routing updates (or any other type of routing updates with the same distance/direction semantics). This disclosure presents a method to use a a sequence of (e.g., consecutive) distance vector events to detect link state changes in the network, and presents algorithms to predetermine a minimum set M of monitors/events needed to detect any link state change in the network. To efficiently detect link failures, the methods of the invention exploit the fact that distance vector protocols use shortest path routing between any two nodes. For example, if the distance between s and d increases over time, then at least one link or node on the old route from s to d must have failed. We can correlate the changed distance from s to d from multiple (s, d) pairs to determine the network element that caused the change in the distance metric. Correlating events from more sources s (e.g., a plurality of selected routers/monitors M) can improve the accuracy of identifying the root causes.

Single Link Failures

Figure 1:
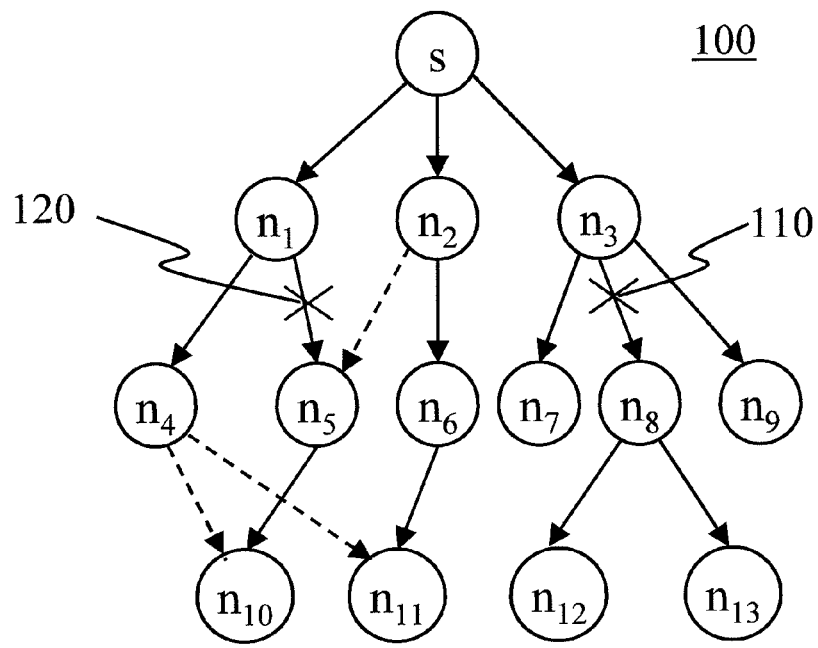
FIG. 1 is a directed acyclic graph (DAG) of a shortest-path routing tree from node for illustrating a single fault diagnosis according to an exemplary embodiment of the invention.

FIG. 1 is a directed acyclic graph (DAG) of a shortest-path routing tree 100 from node s for illustrating a single fault diagnosis according to an exemplary embodiment of the invention. The routing tree from node s comprises N nodes (routers) s, n1, n2, n3, n4, n5, n6, n7, n8, n9, n10, n11, n12, and n13. The routing tree from nodes comprises N−1 links between the N nodes (ignoring the alternative links shown with dashed lines). In the context of directed acyclic graph (DAG), a node (router) may be referred to as a "vertex", and a link between two nodes (routers) may be referred to as an "edge", for example, the link between nodes n3 and n8 may be referred to as "edge n3-n8". The distance (cost) metric over a link (a, b) (e.g., edge n3-n8) is denoted as d(a,b) (e.g., d(n3-n8)).

Let tree(s) denote the tree consisting of all routes originating from s (the routes are shortest paths and there are no cycles). Every router d in the network is a vertex in tree(s). As persons skilled in the art will realize, to find tree(s), distance vector protocols use one of the two basic algorithms: the Bellman-Ford algorithm (which uses only local knowledge of neighboring nodes) or the Dijkstra algorithm (which is more efficient).

As illustrated in FIG. 1, if edge n3-n8 fails (at failure marked by X 110), each of the distance (cost) metrics d(s, n8), d(s, n12), d(s, n13) in tree(s) will increase. However, if edge n3-n8 fails (at failure marked by x 110), the other distance (cost) metrics d(s, n1), d(s, n2), d(s, n4), d(s, n5), d(s, n10) etc. in tree(s) will not be increased thereby. Thus the detected change in the distance (cost) metrics of some edges and the non-change of other edges permits a determination that a failure of edge (link) n3-n8 and/or of node (router) n8 is the root cause of the problem.

FIG. 1 shows the first scenario where edge (3,8) fails, which causes the distances (cost) metrics d(s, n8), d(s, n12), d(s, n13) from s to nodes n8, n12, and n13 to increase. (We assume that links fail at a slower rate than the convergence of the routing protocols used by the network.) By correlating the distance vector updates received at node s at different times, we can conclude that there is a single induced sub-tree (12←8→13) rooted in 8, and the failed link is thus (3,8) (as the last link on the path s→3→8).

More generally, suppose that edge (a,b) in tree(s) fails. Then for every node v such that node b is on the routing path from node s to node v, the distance d(s,v) between node s and node v increases (unless there is an alternative path from s to v with the same distance as the failed path), which results in a distance vector table update among all the routers in the network.

Given the set W of all nodes whose distance from s has increased because edge (a,b) in tree(s) failed, we may consider the sub-graph of tree(s) induced by W (i.e., the sub-tree containing all nodes in W and all edges in tree(s) with both end-points in W). By construction, this sub-graph is a tree (sub-tree). The failed link can be identified as the last link on the routing path from s to the root of the sub-tree (i.e., the node with no incoming edges).

A single node s can monitor N−1 network links in tree(s). Since any tree of N nodes has N−1 links, a single monitor (e.g., router s) can detect at most N−1 link failures. In the worst case, we may need N monitors to cover all the N(N−1) possible directed edges in the network. However, realistic networks are often sparse and the number of monitors sufficient for diagnosis of faults is typically much smaller than n.

Even though each monitor (e.g., router s) in tree(s) covers N−1 links, it can't always detect a failure of a link in the tree. For example, suppose that link (1,5) fails (at failure marked by X 120 in FIG. 1), and that the dashed lines are alternative links existing in the network. Let us also suppose that all links are unit cost (distance=1). The failure of link (1,5) has no effect on the distances d(s, 5), d(s, 10), d(s, 11) because for every node in sub-tree {5,10,11} there exists an alternative route of the same length as the shortest path route before the failure of link (1,5). However, even in this case, the failure of link (1,5) can be detected by observing that the next-hop(s, 4) data in the router table (the designated router/node) changed from n1 to n2.

In some cases, however, it is impossible to detect a failure from the routing table of node s alone, even if the failed link is covered by tree(s) and there are no other failures in the network. Again referring to FIG. 1, suppose that node s connects to nodes n1, n3, and n2 through some gateway node g (instead of connecting to nodes n1, n2 and n3 directly). Then for all other nodes d in the network, next-hop(s, d)=g, and a failure of link (1,5) will go undetected if we peer only with s. The invention is useful in practice because, in the experience of the inventors, such cases are rare and links whose failures may not be detected by the method of the invention will be easily identifiable during the construction of the routing tree by testing if there are two or more equal cost shortest paths from s to some node d.

Multiple Link Failures

Figure 2:
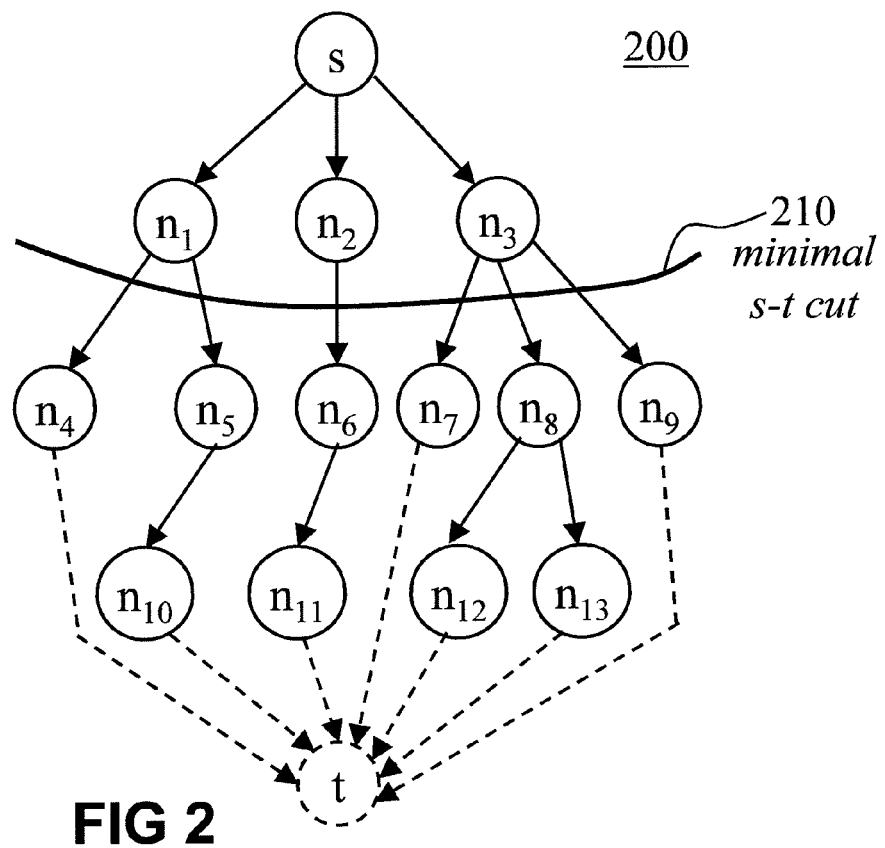
FIG. 2 is a directed acyclic graph (DAG) of routes from node s to dummy node t for illustrating a s-t cut used for determining which concurrent faults can be detected by peering with s according to an exemplary embodiment of the invention.

FIG. 2: is a directed acyclic graph (DAG) 200 of routes from node s to dummy node t for illustrating a s-t cut used for determining which concurrent faults can be detected by peering with s according to an exemplary embodiment of the invention. The DAG(s) 200 of FIG. 2 is obtained by adding a dummy node t to tree(s) of FIG. 1, and a directed edge from each "leaf node" in tree(s) to the dummy node t. (A leaf node is a node with no outgoing links.) FIG. 2 is used to determine the set of all concurrent link failures that can be detected by monitoring router s.

A single node s can monitor concurrent failures on any minimal s-t cut in Directed acyclic graph(s) 200. A set of edges C is a minimal s-t cut if: there exists no s-t path when all the C edges are deleted; and for every edge in C, there exists an s-t path when less than all of the C edges are deleted.

FIG. 2 shows an exemplary s-t cut 210 corresponding to an exemplary partition of the nodes in tree(s) into two sets such that node s and node t belong to different sets. The exemplary s-t cut 210 corresponding to such a partition is the set of all edges in tree(s) crossing the partition (having end points in different sets defined by the partition). It will be apparent to persons skilled in the art that a monitor peered with node s can detect concurrent link failures in any s-t cut in tree(s), if all links that are not detectable from s (see discussion above) are first removed. As previously noted, a directed link (a,b) may not be detectable if there exists an alternative shortest path from s to b not containing (a,b). It is preferable to correlate information from multiple monitors to detect and confirm concurrent edge failures.

Detecting Link Failures

FIGS. 1 and 2 were used to describe symptoms (updates to distance vectors) that are observed by a router/monitor in the event of a link failure. The following section describes a method to infer link failures using these observed symptoms.

Figure 3:
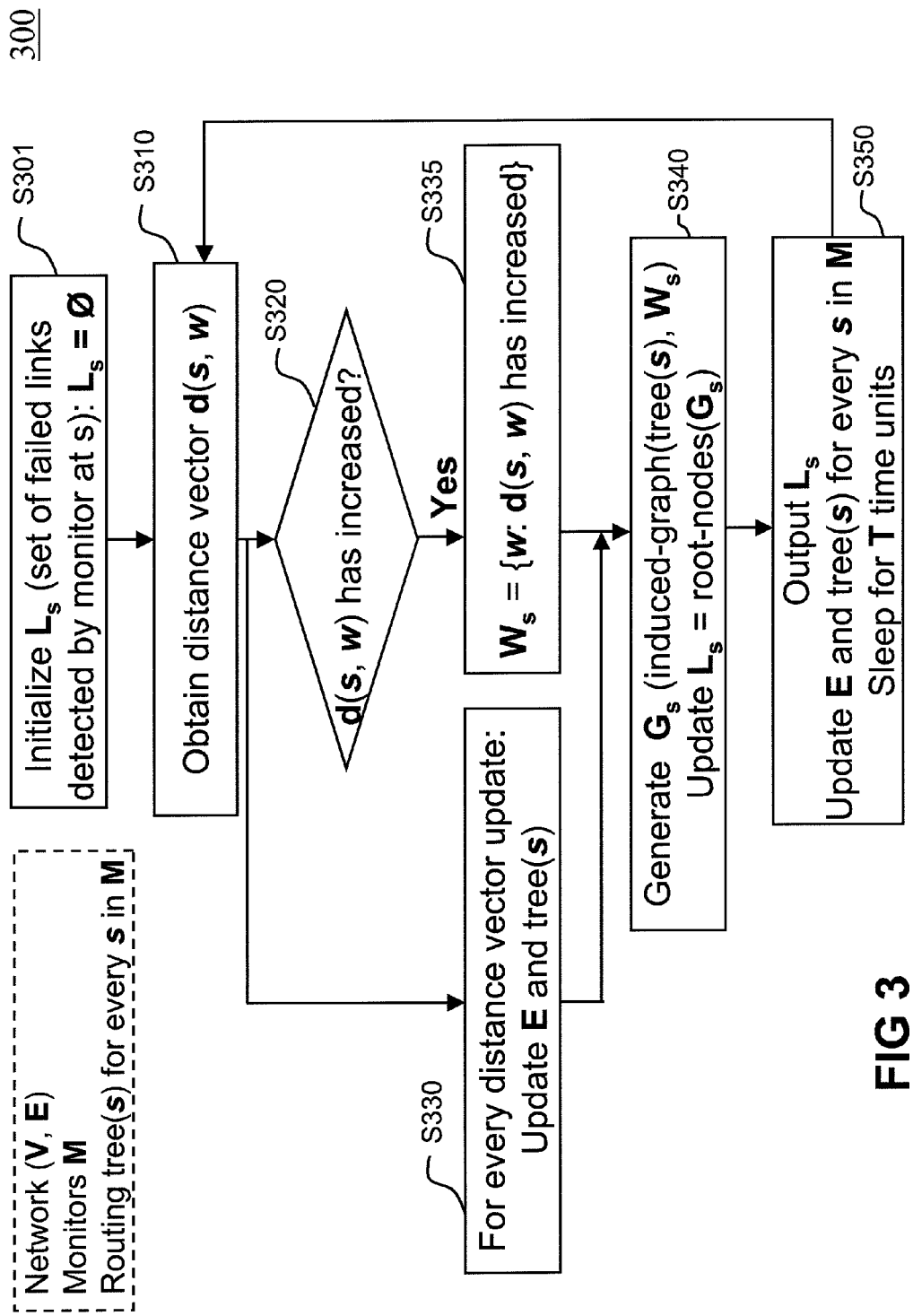
FIG. 3 is a flow chart of a method of detecting link failures using a given set of monitors to receive distance-vector routing updates according to an exemplary embodiment of the invention.

FIG. 3 is a flow chart of a method of detecting multiple link failures using a given set M of monitors (at node s or peered with node s) configured to receive distance-vector routing (table) updates according to an exemplary embodiment of the invention. The flow chart shown in FIG. 3 takes as input the network represented by a set of vertices V, a set of edges E and includes a set of selected monitors M (a subset of V). For every monitor s in M, the steps S301 to S350 are applied.

The network topology is described as a <V, E>, where V is the set of vertices (routers) and E (subset of V×V) is the set of edges (links). Each link e in E may have an associated cost (or weight) denoted by cost(e). The cost d(s, w) of a route from node s to node w is the sum of the cost of all edges on the route from s to w. A distance vector update at a node s minimally includes the following parameters: <d, a, c> which states that the updated next hop from s towards d (nextHop(s, d)) is a with cost=c.

We first address the problem of identifying the set of links whose state changes can be detected by peering with router s. The term dag(s) denotes a directed acyclic graph (DAG) which shows all the routes originating from node s. The dag(s) is constructed as follows: dag(s) is a minimum weight spanning tree rooted at s. Every router in the network topology is a vertex in dag(s). For every router d in the network topology, add a directed edge (nextHop(d, s), d) to dag(s), where nextHop(d, s) denotes the next hop from node d towards node s.

If some edge e=(a, b) in dag(s) fails, then, for every vertex v reachable from b in the DAG dag(s), the cost(s, v) increases; consequently this will result in a change in distance vectors in routing table updates (e.g., in SNMP objects).

Given a a sequence of (e.g., consecutive) distance vectors a failed edge can be determined by the following method: Let us $W_s$ denote the set of vertices such that for all w in $W_s$, cost(s, w) has increased. Let $G_S$ denote the graph induced on dag(s) by $W_s$. Let root(W) denote the set of root nodes in $G_S$. A node b is a root node in $G_S$ if there exists no directed edge (a, b) for some vertex a in $G_S$. Let FS denote the set of edges e=(a, b), where b is in root(W) in dag(s). Then, we conclude that all links in FS have failed.

In the initialization step S301, $L_s$ the set of links whose failure is detected by monitor s is set to null (zero, Ø). In step S310, the monitor (e.g., the router s or a separate apparatus peered with router s) waits until it receives a new distance vector update (routing event). If the received distance vector update (routing event) is a link-up event wherein a new link is identified or a if a distance vector of a previously known route is decreased, then in step S330 the set of links E are updated. In FIG. 3, tree(s) represents the set of all shortest path routes originating from node (router/monitor) (e.g., as for example illustrated in tree(s) of FIG. 1). In step S330, tree(s) is updated to reflect the updated direction vectors and any indicated (new) links therein. In decision step 320, if the received distance vector update (routing event) indicates an increased distance from a monitor s to any node w in the network, then step S335 is next performed. In Step S335, $W_s$ denotes the set of all nodes w whose distance from node (router, monitor) s has increased as indicated in the received updated distance vectors. Step S340, generates $G_s$, a subgraph of tree(s) that is induced by $W_s$ (i.e., the sub-tree containing all nodes in $W_s$ and all edges in tree(s) with both end-points in $W_s$). Step S340 also identifies failed links $L_s$ as the last link on each routing path from s to a root node in $G_s$ (i.e., the node with no incoming edges). Note that $G_s$ can have multiple root nodes, each of which corresponds to one inferred link failure in step S340. Step S350 outputs the set of failed links $L_s$, updates the set of active links E and the routing tree for every monitor s. The sequence of S310 to S350 may be performed periodically (with time period T), or intermittently in response to SNMP traps or other indications of events. A Monitor at node s or peered with node s may passively listen for distance update messages of distance-vector routing protocol, or may periodically poll the routing table, or detect changes of SNMP routing table objects transmitted as a result of setting up SNMP trap.

Optimal Monitor Selection

A network management system according to an embodiment of the invention has at least one monitoring apparatus (e.g., a router or a separate machine "peered" with a router) configured to perform the methods above described. Next herein is described a preferred method of selecting a near-optimal subset of routers in the network for the monitoring apparatus to interface (peer) with. According to an aspect of the invention, a monitoring infrastructure can be designed that can effectively infer the state of remote links (i.e., links that are not directly incident to any monitoring node) from distance-vector routing updates. Disclosed algorithms correlate the local updates of the networks distance vectors from the subset M of routers to all other routers with the changes to the cost of links in remote parts of the network.

A minimum set M of routers needed to cover all k-concurrent failures maximizes failure detection probability as a "set covering problem" over detect(s) for all routers s. The "set covering problem" is a classical question in computer science and complexity theory. As input you are given several sets. The sets may have some elements in common. You must select a minimum number of these sets so that the sets you have picked contain all the elements that are contained in any of the sets in the input. The "set covering problem" was one of Karp's 21 NP-complete problems shown to be NP-complete in 1972. One can use any exact or approximate algorithm for solving the set covering problem to determine the optimal set of monitored routers.

Given the constraint that we can monitor only m routers an optimal set of routers is selected to monitor with the goal of maximizing the probability of detecting failures. Let us suppose we monitor router s. Let us suppose that there exists a directed edge (a, b) in dag(s) in FIG. 1. If there exists two or more equal cost shortest paths form nextHop(s, a) to b that does not include the edge (a, b) then add edge (a, b) to eqc(s). Add a dummy node t to dag(s) (see FIG. 2) and an edge from each leaf node in dag(s) to the dummy node t. A node a is a leaf node in dag(s) if there exists no node b such that a directed edge (a, b) belongs to dag(s). Let C denote a set of edges in a maximal s-t cut on dag(s). Then, when we peer with router s, we can detect all concurrent edge failures in $2^{C-eqc(s)}$, where $2^X$ denotes the power set of edges in X. We compile the set of all such maximal cuts C in a multi-set detect(s). We now formulate the minimum set M of routers needed to cover all k-concurrent failures, and we monitor m-routers with the goal of maximizing failure detection probability as a set cover over detect(s) for all routers s. One can use any exact or approximate algorithm for solving the set cover problem to determine the optimal set of monitored routers.

Figure 4:
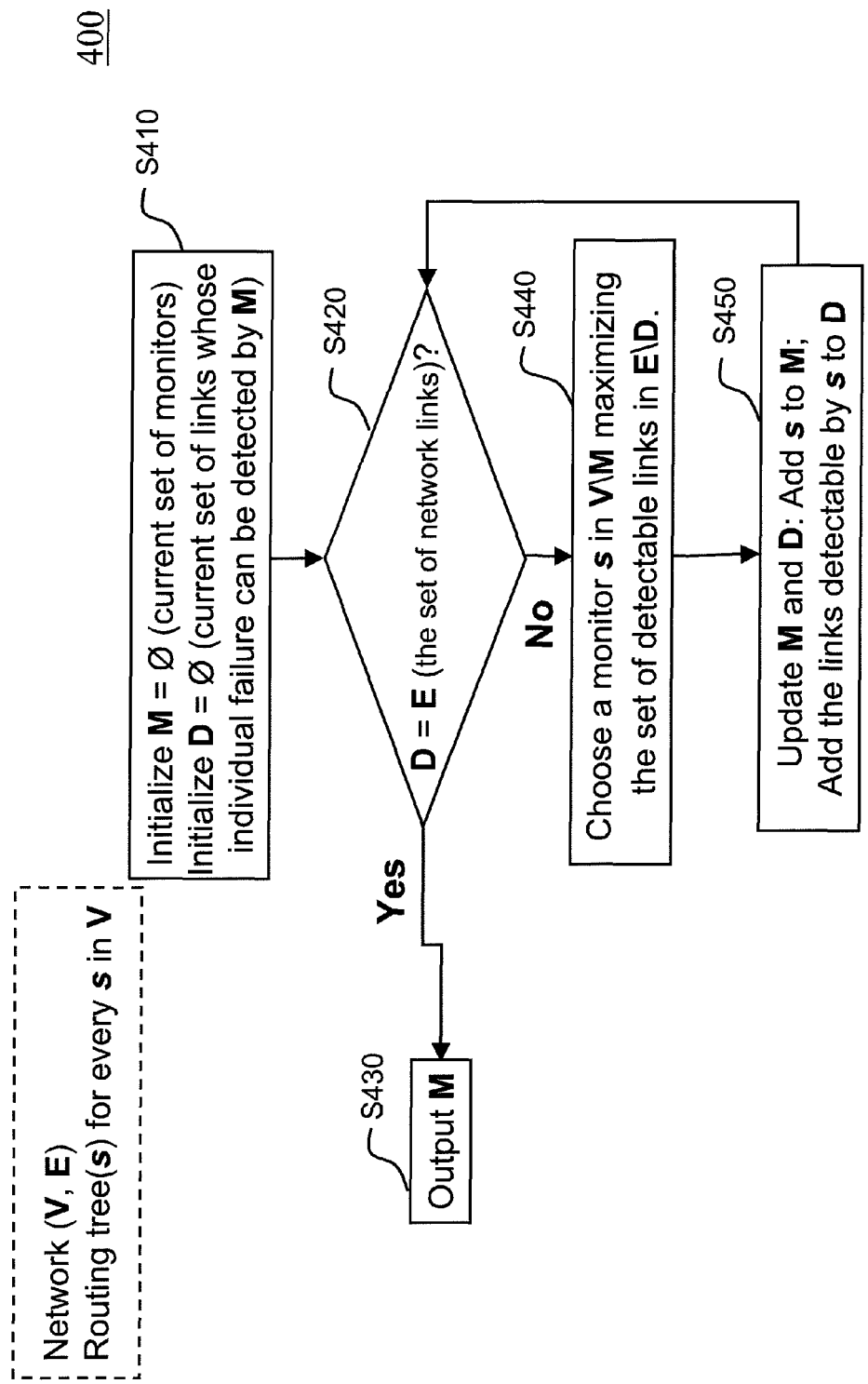
FIG. 4 is a flow chart of a first greedy monitor selection algorithm for selecting monitors to detect all single failures according to an exemplary embodiment of the invention.

Starting with an arbitrary node s, the algorithm first determines the largest set of links whose failure can be confidently detected by monitoring s. In particular, for every directed link (a,b) in tree(s), the algorithm checks whether there exists another shortest path from s to b that does not contain (a,b). If there is no alternative path, the algorithm adds (a,b) to the set D of detected links (initially the empty set). The node s can be chosen to maximize the size of the detectable link set. The algorithm then proceeds greedily by choosing an additional monitor and adding the links it detects into D. The monitor can be chosen to maximize the number of links it detects given the links already in D. The algorithm stops when all links are in D. If the hardware provided for executing the method of FIG. 3 is configured to monitor only m routers, the algorithm stops after choosing m monitors. Since D is maximized at every iteration, a good approximation to the optimal subset of m routers is the expected result. The subset D of links in the network can serve as a rough estimate of the probability of detecting a fault, if all link faults are equiprobable. This algorithm for approximating an optimal set of monitors is illustrated in FIG. 4.

The problem of choosing an optimal set of link state monitors is NP-complete (which may be shown via a reduction from Vertex Cover, a well-known NP-complete problem). All known algorithms for NP-complete problems require time that is super-polynomial in the input size (the size of the network), and it is unknown whether there are any faster algorithms. Hence we propose a greedy approximation algorithm that identifies a sufficient set M of routers (monitors).

Given a plurality of links(s) for every router s in the network (link(s) is the set of all links in dag(s)), the algorithm essentially picks nodes s so as to maximize the number of links(s) for each router s in the network, to ultimately find minimal monitor sets M of routers that cover all links in the network:

Pick node s=argmax_s(|links(s)|)
IF |links(s)|=0, THEN terminate
ADD s to monitor set M
For every other node n, set links(n)=links(n)\links(s)

FIG. 4 is a flow chart of a greedy monitor selection algorithm for selecting a set M of monitors to detect all single failures according to an exemplary embodiment of the invention. The input to this algorithm includes the set of all nodes V and the set of links E in the network, as indicated in the KEY block shown with dashed lines in FIG. 4. In the initialization step S410, the set of chosen monitors M is set to null (zero, Ø), and the set D of links whose failure can be detected is set to null (zero, Ø). In decision step S420, IF the set D of links covers all edges E in the network (branch YES of S420), THEN output step S430 is performed to output the set M of chosen monitors, and if not (branch NO of S420), THEN step S440 is next (or again) performed.

In Step S440, the algorithm greedily picks the next best monitor as follows: For every node s in V\M (nodes in V but not in M) use the routing tree(s) to determine the set of edges in E\D (i.e., links in E but not in D) whose failure can be confidently detected using s. In particular, for every directed link (a,b) in tree(s), check whether there exists another shortest path from s to b that does not contain (a,b). If there is no alternative path from s to that does not contain (a,b), then conclude that the link (a,b) can be monitored using s. The node s can be chosen to maximize the size of the detectable set. In step S440 the algorithm picks the node s that maximizes the number of detectable links in E\D (i.e., links in E but not in D). In step S450 the chosen node s is added to the set M of monitors and set of links whose failure can be detected using s is added to D. Steps S420-S450 are repeated until D covers all the links E in the network.

The simplest modification for monitoring concurrent faults is to add the largest detectable s-t cut to D (instead of adding all detectable links). The problem of finding the largest cut is NP-complete. Consequently no polynomial-time algorithms for max-cut can be expected, however heuristic search methods efficiently produce approximate solutions. The algorithm may be extended to concurrent faults based on keeping track of all diagnosable k-link subsets of edges, wherein O(nk) subsets are tracked.

Additionally, if because of some constraint we can monitor only m routers, the algorithm can stop after choosing m monitors. Since set D of detectable links is maximized in every iteration, we can expect a good approximation to the optimal subset of m routers. The selection of links in D can serve as a rough estimate of the probability of detecting a fault, if all link faults are equiprobable.

Figure 5:
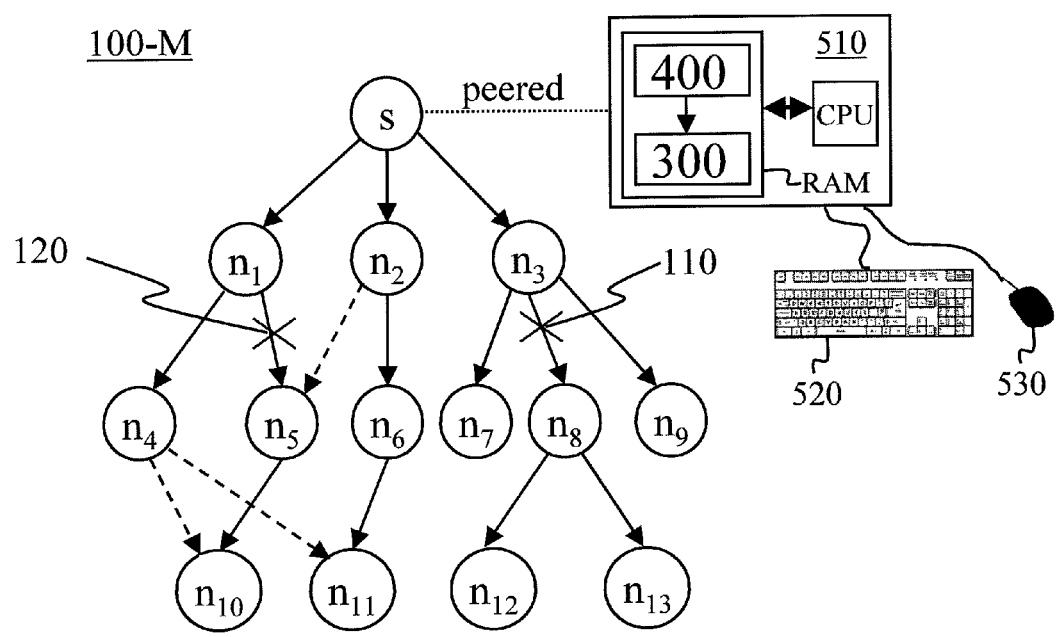
FIG. 5 is a combination of the DAG(s) of FIG. 1 and a block diagram of an external apparatus type monitor peered with router s in DAG(s).

FIG. 5 is a combination of the DAG(s) of FIG. 1 and a block diagram of an external apparatus type monitor 510 peered with router s in DAG(s).

FIG. 5 includes DAG(s) of FIG. 1 combined with a block diagram illustrating a separate apparatus monitor (e.g., a personal computer, PC) peered with the router at node s and configured to execute the methods and algorithms of FIGS. 3 & 4.

Each monitor in a system according to an embodiment of the present invention may be a conventional router at node s adapted to perform the method of FIG. 3, or an external apparatus monitor (e.g., a computer) 510 that interfaces (peers) with a selected router(s) at one or more nodes s in M, configured to receive updates to the network distance vectors, and to infer the link states of entire network. An external apparatus type monitor (e.g., a personal computer or network server) 510 may comprises a central processing unit CPU coupled to a memory (e.g., random access memory, RAM) by a system bus as shown in FIG. 5. The memory (e.g., RAM) may be configured to store and/or execute-in-place a set of computer-executable instructions that perform the methods 400 and 300 of FIGS. 4 and 3 respectively, or any portions thereof. The external apparatus monitor (e.g., a computer) 510 may further include conventional operator-interface peripherals such as a keyboard 520 a mouse 530 and a display (not shown). The external apparatus monitor (e.g., a personal computer or network server) 510 may further include a network interface card (not shown) for supporting the network link labeled "peered" to the router s.

An external apparatus monitor 510 may passively listen to distance vector updates received by/from router s by peering with router s. Additionally or alternatively, the external apparatus monitor 510 can periodically poll for changes in the routing table at router s. Additionally or alternatively, by using a SNMP trap mechanism, the external apparatus monitor 510 may detect distance vector changes in SNMP routing table objects. It is typically infeasible for the external apparatus type monitor to peer with all routers in the network (or to poll all the routing tables thereof); so the external apparatus monitor 510 may peer with plurality of routers (not shown) consisting of only a subset D of the routers in the network. The external apparatus monitor 510 attempts to infer a link's state by correlating the distance vectors according to the method illustrated in FIG. 3.

As described above, according to exemplary embodiments of the present invention, link status in network can be determined and the performance of the network can be maintained, restored, or improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of determining link states in a network comprising a plurality of routers and a monitoring apparatus, the method performed by the monitoring apparatus comprising:

comparing corresponding distance vectors in a sequence of routing table updates received from a selection of the plurality of routers in the network, wherein the selection of the plurality of routers is less than all the plurality of routers, wherein the selection of the plurality of routers are an approximate solution of a set covering problem of selecting a plurality of routers capable of detecting any failed link in the network; and determining the link states based upon a difference in the sequence of the corresponding distance vectors.

2. The method of claim 1, wherein selecting the routers includes determining for every directed link (a,b) from router a to router b in directed acyclic graph (DAG) tree(s), whether there exists an alternative shortest path from router s to the router b that does not contain directed link (a,b).

3. The method of claim 1, wherein the selection of the plurality of routers includes a router s that maximizes a size of a detectable link set.

4. The method of claim 1, wherein selecting the routers includes determining the largest set of links whose state changes can be detected by monitoring a selected router's distance vector routing tables.

5. The method of claim 1, further comprising configuring a monitor peered with a router among the selected routers to periodically receive the distance vectors in a sequence of routing table updates.

6. The method of claim 5, further comprising configuring the monitor to perform the determination of the link states based upon a difference in a sequence of corresponding distance vectors.

7. The method of claim 1, wherein the comparing of corresponding distance vectors in a sequence of routing table updates is performed by a router in the network.

8. The method of claim 1, wherein the comparing of corresponding distance vectors in a sequence of routing table updates is performed by a monitoring apparatus peered with a router in the network.

9. The method of claim 1, wherein the receiving of distance vectors includes periodically polling a router in the network.

10. The method of claim 1, wherein the receiving of distance vectors is caused by establishing a Simple Network Management Protocol (SNMP) trap for SNMP routing table objects.

11. A method of determining link states in a network comprising a plurality of routers and a monitoring apparatus, the method performed by the monitoring apparatus comprising:

comparing corresponding distance vectors in a sequence of routing table updates received from a selection of the plurality of routers in the network, wherein the selection of the plurality of routers is less than all the plurality of routers, wherein routers among the selection of routers are selected based on a likelihood that differences in corresponding distance vectors in the sequence of routing table updates can indicate the link states of all active links in the network; and determining the link states based upon a difference in the sequence of the corresponding distance vectors.

* * * * *